US010864449B2

(12) United States Patent
Hanna (10) Patent No.: US 10,864,449 B2
(45) Date of Patent: Dec. 15, 2020

(54) ROTATABLE CHAIR WITH PROJECTILE LAUNCHER

(71) Applicant: Daniel Hanna, Encino, CA (US)

(72) Inventor: Daniel Hanna, Encino, CA (US)

( * ) Notice: Subject to any disclaimer, the term of this patent is extended or adjusted under 35 U.S.C. 154(b) by 209 days.

(21) Appl. No.: 16/156,173

(22) Filed: Oct. 10, 2018

(65) Prior Publication Data

US 2019/0255449 A1 Aug. 22, 2019

Related U.S. Application Data

(60) Provisional application No. 62/634,008, filed on Feb. 22, 2018.

(51) Int. Cl.
*A63G 33/00* (2006.01)
*B62D 61/00* (2006.01)
(Continued)

(52) U.S. Cl.
CPC ............ *A63G 33/00* (2013.01); *A47C 1/00* (2013.01); *A47C 3/18* (2013.01); *A47C 7/006* (2013.01); *A47C 7/62* (2013.01); *A47C 15/004* (2013.01); *A63B 67/002* (2013.01); *A63G 31/007* (2013.01); *B60K 26/02* (2013.01);
(Continued)

(58) Field of Classification Search
CPC ........ B62D 61/00; B62D 61/06; A63B 65/12; A63B 65/125; A63B 67/00; A63B 67/002; A62G 33/00
See application file for complete search history.

(56) References Cited

U.S. PATENT DOCUMENTS

| 728,504 A | * | 5/1903 | Schramm | ............. A63B 65/125 |
| | | | | 473/511 |
| 3,336,030 A | * | 8/1967 | Martell | .................. A63G 33/00 |
| | | | | 273/349 |

(Continued)

FOREIGN PATENT DOCUMENTS

WO 2002032529 A1 4/2002

OTHER PUBLICATIONS

'Bumper Boats'. Wikipedia, The Free Encyclopedia [online]. Retrieved by web.archive.org [Retrieved on Feb. 10, 2013]. Retrieved from the Internet: <URL: https://web.archive.org/web/20130210011830/ https://en.wikipedia.org/wiki/Bumper_boats >. (Year: 2013).*

*Primary Examiner* — Barry Gooden, Jr.
(74) *Attorney, Agent, or Firm* — Diament Patent Law, P.C.; Adam Diament (57) ABSTRACT

A rotatable chair is provided with a launching member and a set of wheels. The chair includes: (i) a seat; (ii) a base; (iii) a plurality of framing members; (iv) a joystick; (v) a launching member; (vi) a nozzle; (vii) a set of motorized wheels; (viii) a directional wheel; (ix) an emergency stop button; and (x) a plurality of detachment devices to easily and quickly dismantle the chair into easily transportable parts. The base encloses a motor, a battery, a set of wheels and a water tank. The joysticks are configured to control the movement of the chair. The launching member can shoot a plurality of balls. The nozzles are configured to spray water from the water tank. The set of motorized wheels and the directional wheel are configured to move and rotate the chair, respectively. The emergency stop button is configured to stop the chair from moving.

13 Claims, 7 Drawing Sheets

(51) Int. Cl.
  *B62D 61/06* (2006.01)
  *A47C 1/00* (2006.01)
  *A47C 7/00* (2006.01)
  *A47C 7/62* (2006.01)
  *A63B 67/00* (2006.01)
  *F41B 9/00* (2006.01)
  *A63G 31/00* (2006.01)
  *B60K 26/02* (2006.01)
  *A47C 3/18* (2006.01)
  *A47C 15/00* (2006.01)

(52) U.S. Cl.
  CPC .............. *B62D 61/00* (2013.01); *B62D 61/06* (2013.01); *F41B 9/0059* (2013.01); *B60K 2026/029* (2013.01)

(56) References Cited

U.S. PATENT DOCUMENTS

| | | | |
|---|---|---|---|
| 4,185,608 A * | 1/1980 | Young | A63F 7/2472 124/16 |
| 5,011,161 A * | 4/1991 | Galphin | A63F 7/045 273/349 |
| 5,295,890 A * | 3/1994 | Myers | A63H 17/006 446/176 |
| 5,577,736 A | 11/1996 | Arabo | |
| 5,586,688 A | 12/1996 | Johnson et al. | |
| 6,019,682 A | 2/2000 | Arabo | |
| 6,220,965 B1 * | 4/2001 | Hanna | A63G 7/00 463/52 |
| 8,808,100 B2 | 8/2014 | Publicover et al. | |
| 2002/0066387 A1 | 6/2002 | Mares | |
| 2005/0288111 A1 | 12/2005 | Cowan et al. | |
| 2006/0082066 A1 * | 4/2006 | Woods, Jr. | F41B 9/00 273/349 |
| 2006/0178085 A1 * | 8/2006 | Sotereanos | A63H 17/14 446/456 |
| 2006/0293110 A1 * | 12/2006 | Mendelsohn | A63G 1/00 472/137 |
| 2007/0135218 A1 * | 6/2007 | Williams | A63G 25/00 463/49 |
| 2009/0005196 A1 * | 1/2009 | Kessler | A63B 63/00 473/476 |
| 2009/0118024 A1 * | 5/2009 | Yule | A63G 21/18 472/128 |
| 2010/0173717 A1 * | 7/2010 | Yule | A63G 21/18 472/128 |
| 2015/0045155 A1 * | 2/2015 | Chen | A63B 59/50 473/564 |
| 2015/0265933 A1 * | 9/2015 | Magrath, III | A63G 33/00 472/137 |
| 2017/0368433 A1 * | 12/2017 | Nelson | A63B 69/407 |
| 2019/0366223 A1 * | 12/2019 | Sall | A63G 5/00 |

\* cited by examiner

ROTATABLE CHAIR WITH PROJECTILE LAUNCHER

CROSS-REFERENCE TO RELATED APPLICATIONS

This application claim benefit of U.S. Provisional Patent Application No. 62/634,008, entitled "Rotatable Chair for Amusement," filed Feb. 22, 2018.

FEDERALLY SPONSORED RESEARCH OR DEVELOPMENT

None.

FIELD OF THE DISCLOSURE

The present invention is in the technical field of chairs and launchers. More particularly, the present invention is in the field of a rotatable chair for amusement having a joystick to control movement and controls to launch objects.

BACKGROUND OF THE INVENTION

People in modern world live a busy life. Stressful lifestyles and lack of entertainment may make people unhealthy and prone to several ailments like obesity and allergies. Rides for amusement are one way for a person to take time out of the hectic schedule and feel relaxed. Rides also can be used as a form of engagement with other, especially when the rides or amusement devices focus on battle with other people in a safe environment. Using a chair or seat in an amusement device is one way that people can safely engage with each other. For example, a bumper car, which include a seat and wheels, is one type of device that opponents can use to battle each other, while the participants are safely protected within the vehicle. Bumper cars are relatively safe because the user is seated and in a semi-enclosed device.

There have been a variety of other chair-like devices and other amusement devices that are motorized that can be used for amusement and entertainment. U.S. Patent Application Pub No. 20050288111 to Cowan et al. discloses a motorized amusement ride apparatus and method. U.S. Patent Application Pub. No. 20020066387 to Mares discloses a modularized amusement ride and training simulation device. U.S. Pat. No. 6,019,682 discloses a vehicle for amusement game. U.S. Pat. No. 5,577,736 to Arabo discloses an entertainment game utilizing electrically powered cars. International Patent Application No. WO2002032529 to Yoon discloses a chair driving method and chair thereof. Amusement devices have also been disclosed that project water or other objects toward a person or target, such as U.S. Pat. No. 8,808,100 to Publicover at al. for swing play systems and methods of play, and U.S. Pat. No. 5,586,688 to Johnson et al. All patents, patent applications, and non-patent literature cited in this application are hereby incorporated by reference in their entireties, for all purposes.

Despite the features of the above disclosed devices, there remains a need for other seated devices that can be used for entertainment.

BRIEF SUMMARY OF THE PRESENT INVENTION

In view of the foregoing, an embodiment herein provides a rotatable chair. The rotatable chair includes: (i) a seat; (ii) a motor; (iii) a battery; (iv) a set of wheels; (v) a water tank; (vi) a base; (vii) a plurality of framing members; (viii) one or more joysticks; (ix) a launching member; (x) a nozzle; and (xi) a trigger.

The base encloses the motor, the battery, the set of wheels and the water tank. The one or more joysticks are configured to control the movement of the rotatable chair. The launching member is configured to shoot a plurality of projectiles, and the trigger may be one or more nozzles that are configured to spray water from the water tank. Other triggers may be configured to actuate the launching member and the nozzle.

The rotatable chair may further include: (i) an emergency stop button configured to stop the rotatable chair; and (ii) a plurality of detachment devices configured to fasten or connect the plurality of framing members to the base. The set of wheels of the rotatable chair include: (i) a plurality of motorized wheels configured to move the rotatable chair; and (ii) a directional wheel configured to provide direction to the rotatable chair. The battery is configured to provide power to the motor to run the plurality of motorized wheels.

The one embodiment, the rotatable chair is configured to move in forward direction when a user moves one or more joysticks in forward direction. The rotatable chair is configured to move in backward direction when the user moves the one or more joysticks in backward direction. The rotatable chair is configured to move or rotate in a left direction when the user moves the one or more joysticks in left direction. The rotatable chair is configured to move or rotate in a right direction when the user moves the one or more joysticks in a right direction.

The one or more joysticks includes: (i) a first joystick configured to operate the launching member to shoot the plurality of balls; and (ii) a second joystick configured to operate the one or more nozzles to spray water from the water tank. The one or more joysticks further include: (i) a first trigger member configured to be located on the first joystick; and (ii) a second trigger configured to be located on the second joystick.

In view of the foregoing, another embodiment herein provides a launching member. The launching member includes: (i) a plurality of projectiles; (ii) a weight; (iii) a flexible elongated member such as a cable or rope; (iv) a pulley; and (v) a hammer. The plurality of projectiles rest on a platform. The weight is configured to balance the plurality of projectiles. The rope is configured to hold the weight at one end and the platform on another end. The hammer includes a hammer head configured to strike the plurality of projectiles. The plurality of projectiles may be plurality of balls.

In another aspect, an amusement chair is provided with a launching member and a set of wheels. The amusement chair includes: (i) a seat; (ii) a base; (iii) a plurality of framing members; (iv) one or more joysticks; (v) the launching member; (vi) one or more nozzles; (vii) a set of motorized wheels; (viii) a directional wheel; (ix) an emergency stop button; and (x) a plurality of detachment devices. The base encloses a motor, a battery, a set of wheels and a water tank. The one or more joysticks are configured to control the movement of the amusement chair. The launching member is configured to shoot a plurality of balls. The one or more nozzles are configured to spray water from the water tank. The set of motorized wheels is configured to move the rotatable chair. The directional wheel is configured to rotate the rotatable chair. The emergency stop button is configured to stop the amusement chair. The plurality of detachment devices are configured to fasten the plurality of framing members to the base.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

DETAILED DESCRIPTION OF EMBODIMENTS

The invention now will be described more fully hereinafter with reference to the accompanying drawings, in which embodiments of the invention are shown. This invention may however be embodied in many different forms and should not be construed as limited to the embodiments set forth herein. Rather, these embodiments are provided so that this disclosure will be thorough and complete, and will fully convey the scope of the invention to those skilled in the art.

It will be understood that when an element is referred to as being "on" another element, it can be directly on the other element or intervening elements may be present therebetween. As used herein, the term "and/or" includes any and all combinations of one or more of the associated listed items.

It will be understood that, although the terms first, second, third etc. may be used herein to describe various elements, components, regions, layers, and/or sections, these elements, components, regions, layers, and/or sections should not be limited by these terms. These terms are only used to distinguish one element, component, region, layer, and/or section from another element, component, region, layer, and/or section.

It will be understood that the elements, components, regions, layers and sections depicted in the figures are not necessarily drawn to scale.

The terminology used herein is for the purpose of describing particular embodiments only, and is not intended to be limiting of the invention. As used herein, the singular forms "a," "an," and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom," "upper" or "top," "left" or "right," "above" or "below," "front" or "rear," may be used herein to describe one element's relationship to another element as illustrated in the Figures. It will be understood that relative terms are intended to encompass different orientations of the device in addition to the orientation depicted in the Figures.

Unless otherwise defined, all terms used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments of the present invention are described herein with reference to idealized embodiments of the present invention. As such, variations from the shapes of the illustrations as a result, for example, of manufacturing techniques and/or tolerances, are to be expected. Thus, embodiments of the present invention should not be construed as limited to the particular shapes of regions illustrated herein but are to include deviations in shapes that result, for example, from manufacturing. The invention illustratively disclosed herein suitably may be practiced in the absence of any elements that are not specifically disclosed herein.

The present inventive device relates to a rotatable chair for amusement and projectile launcher. As used herein and throughout,"

As mentioned, there remains a need for an apparatus, in the form of a rotatable chair that entertains the user. The embodiment herein achieves this by providing a chair that is rotatable and is equipped with a ball launcher and water spray nozzle. Referring now to the drawings, and more particularly to FIGS. 1A through 3, where similar reference characters denote corresponding features consistently throughout the figures, there are shown preferred embodiments.

Figure 1A:
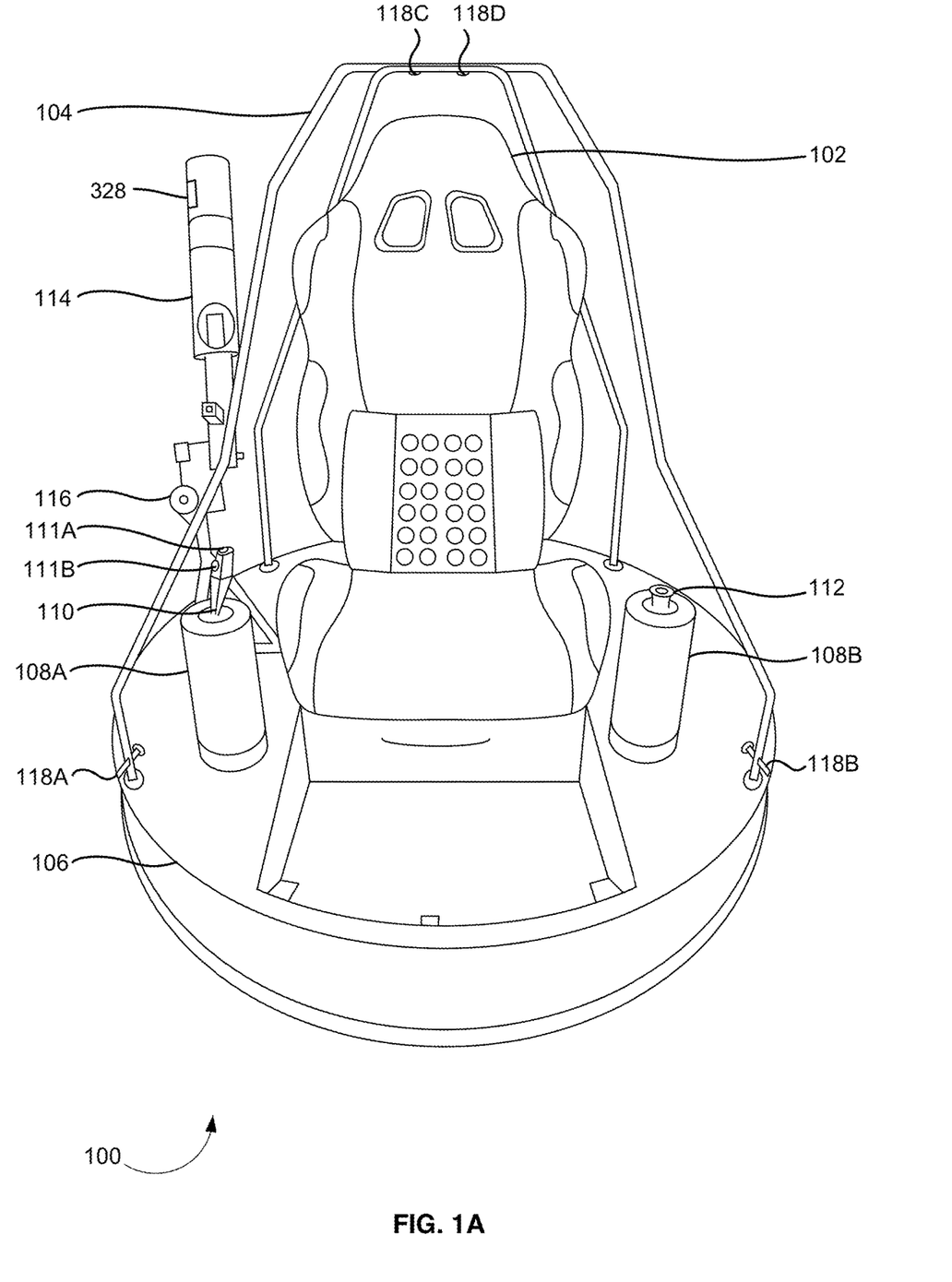
FIG. 1A is a front view of a rotatable chair according to an embodiment herein.

FIG. 1A is a front view of a rotatable chair 100 according to an embodiment herein. The rotatable chair 100 includes a seat 102 positioned on top of a base 106, a plurality of framing members 104, a base 106, a first pole 108A, a second pole 108B, a joystick 110, a first trigger member 111A, a second trigger member 111B, an emergency stop button 112, a launching member 114, a nozzle 116, and a plurality of detachment devices 118A, 118B, 118C, and 118D. A user sits on the seat 102. In an embodiment, the seat 102 is detachable. The base 106 encloses a motor, a battery 122, a set of wheels and a water tank (not shown in FIG. 1A). The plurality of detachment devices 118A (first detachment device), 118B (second detachment device), 118C (third detachment device), and 118D (fourth detachment device) couple the plurality of framing members 104 to the base 106 and to the seat 102. The first pole 108A includes the joystick 110 at the top of the first pole 108A. The joystick 110 controls the movement of the rotatable chair 100. The joystick 110 is in direct communication with a computing device 128 (shown in FIG. 1C). The second pole 108B includes the emergency stop button 112 at the top of the second pole 108B. The emergency stop button 112 terminates the commands given by the user. The rotatable chair 100 further includes the launching member 114 to launch projectile. The launching member 114 encloses a plurality of projectiles. The rotatable chair 100 further includes the nozzle 116 to spray water. In one embodiment, the rotatable chair moves with the help of a set of wheels.

When the user pushes the joystick 110 in forward direction, the rotatable chair 100 moves in forward direction. When the user pulls the joystick 110 in backward direction, the rotatable chair 100 moves in backward direction. The rotatable chair 100 moves left and right when the user moves the joystick 110 in left and right direction respectively. The joystick 110 further includes a plurality of trigger members 111A and 111B to control the spraying of water and the movement of the hammer of the launching member 114 to launch projectiles from the launching member 114. In one embodiment, the projectiles may be balls. A first trigger member 111A of the joystick 110 is a first button to trigger the hammer of the launching member 114. When the user presses the first button, the hammer hits a ball with great impact thereby shooting the ball. A second trigger member 111B of the joystick 110 is a second button to trigger the nozzle 116. When the user presses the second button, the water from the water tank travels the pipe and escapes in the form of a spray from the nozzle 116. Any number of water sprayers can be used, including manual or electric. Electric water sprayers using pumps are known, such as the one disclosed in U.S. Pat. No. 5,586,688 to Johnson et al., incorporated by reference in its entirely for all purposes.

Figure 1B:
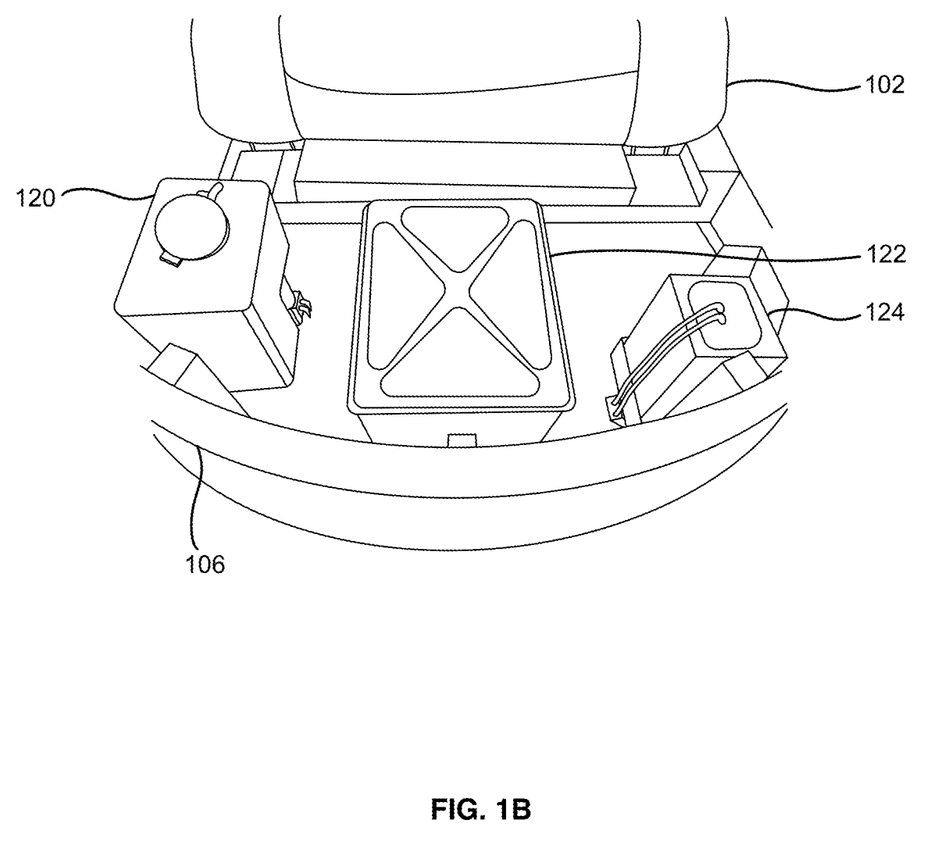
FIG. 1B shows the rear view of the base of the rotatable chair of FIG. 1A according to an embodiment herein.

FIG. 1B shows the rear view of the base 106 of the rotatable chair 100 of FIG. 1A according to an embodiment herein. The base 106 includes a water tank 120, a battery 122, and a motor 124. The water tank 120 supplies water to the nozzle 116. The battery 122 provides power to the motor 124 to run the wheels (not shown in FIG. 1B) to move the rotatable chair 100 of FIG. 1A.

Figure 1C:
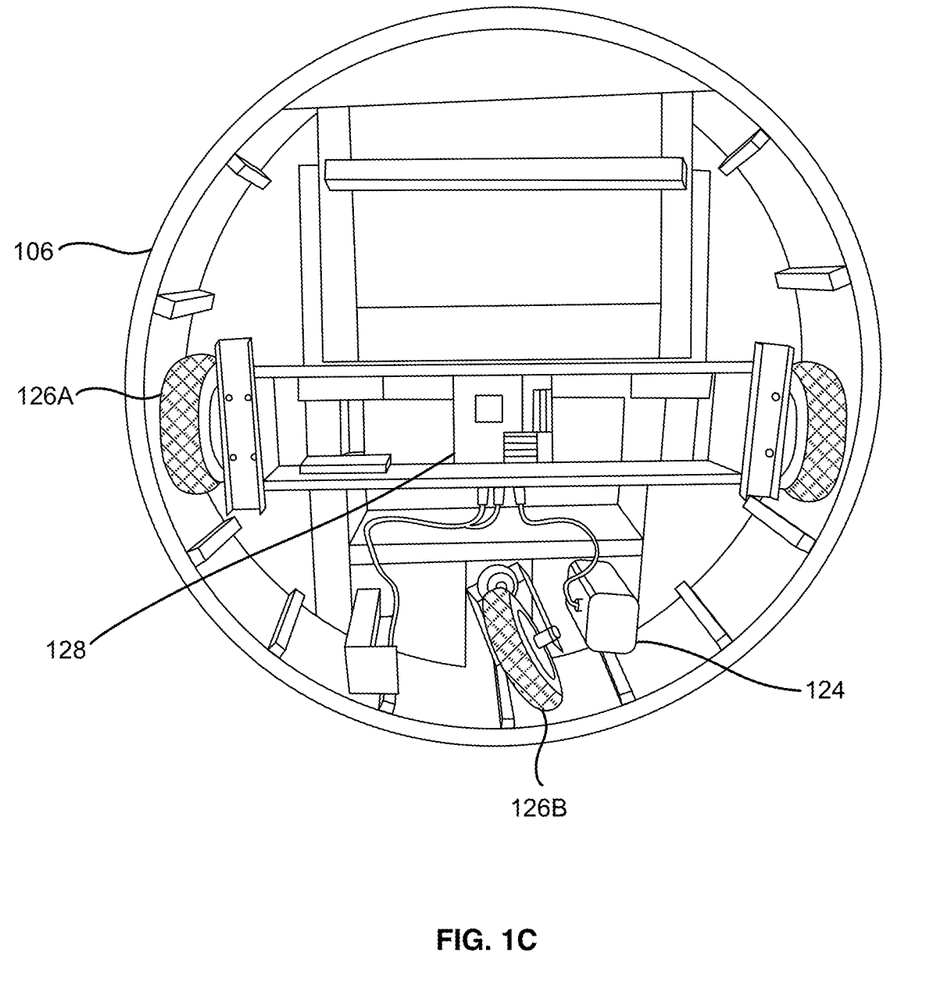
FIG. 1C is a bottom view of the rotatable chair of FIG. 1A according to an embodiment herein.

FIG. 1C is a bottom view of the rotatable chair 100 of FIG. 1A according to an embodiment herein. The bottom view illustrates the motor 124, a set of motorized wheels 126A, a directional wheel 126B (which may or may not be motorized) and the computing device 128. The motor 124 is on direct communication with the computing device 128. Movement of the joystick 110 sends a signal to the computing device 128. The computing device 128 then responds to received signal by operating the motor 124 in the required direction. Computing devices capable of receiving input from a joystick are well known by those having ordinary skill in the art that can translate directional movement of a joystick 110 to movement of wheels or other members capable of movement and rotation. The set of motorized wheels 126A move the rotatable chair 100 (such as in a forward, backward, or side to side motion), and the directional wheel 126B rotates the rotatable chair 100.

Figure 1D:
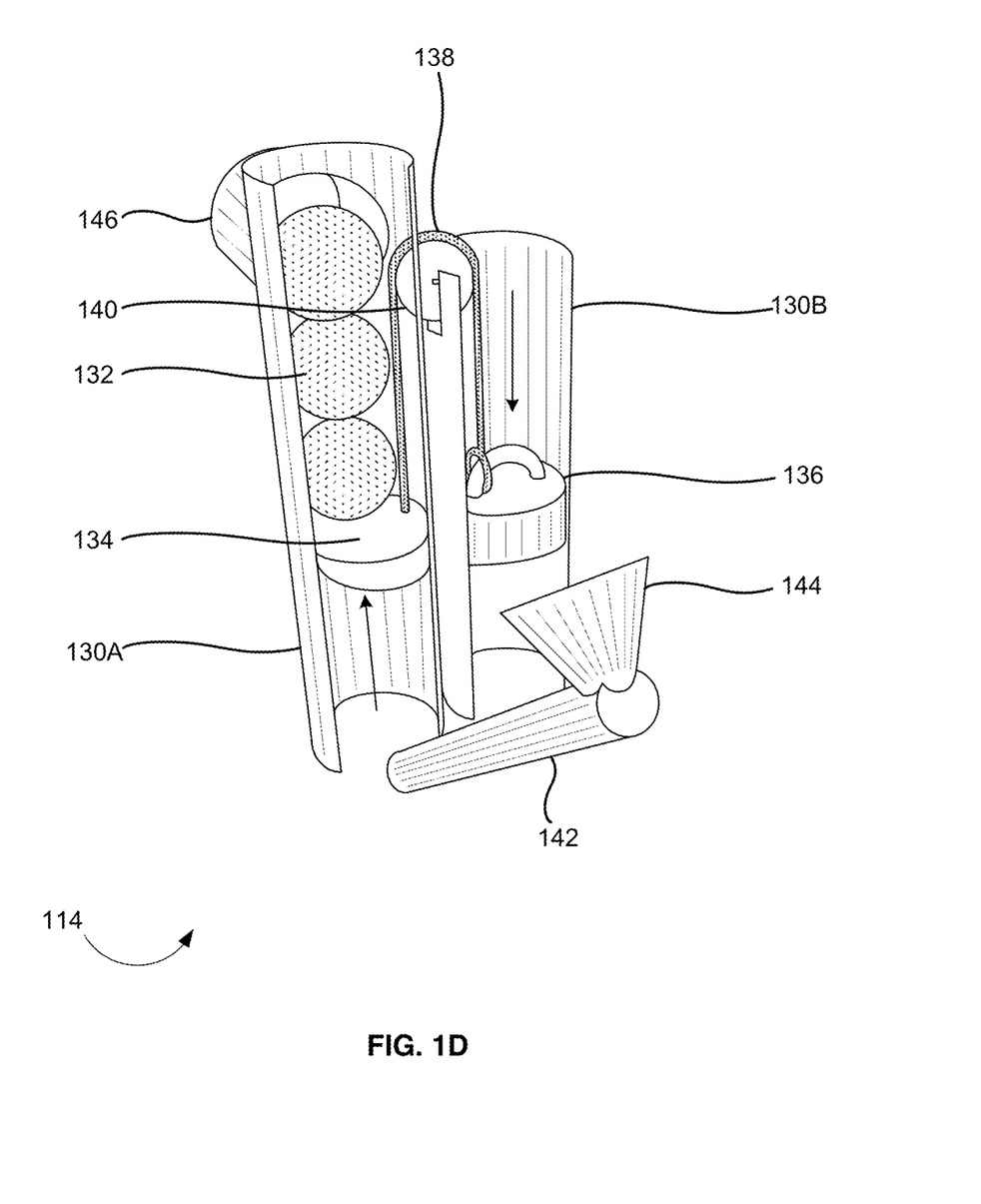
FIG. 1D is a perspective view of the launching member of the rotatable chair of FIG. 1A according to an embodiment herein.
Figure 2A:
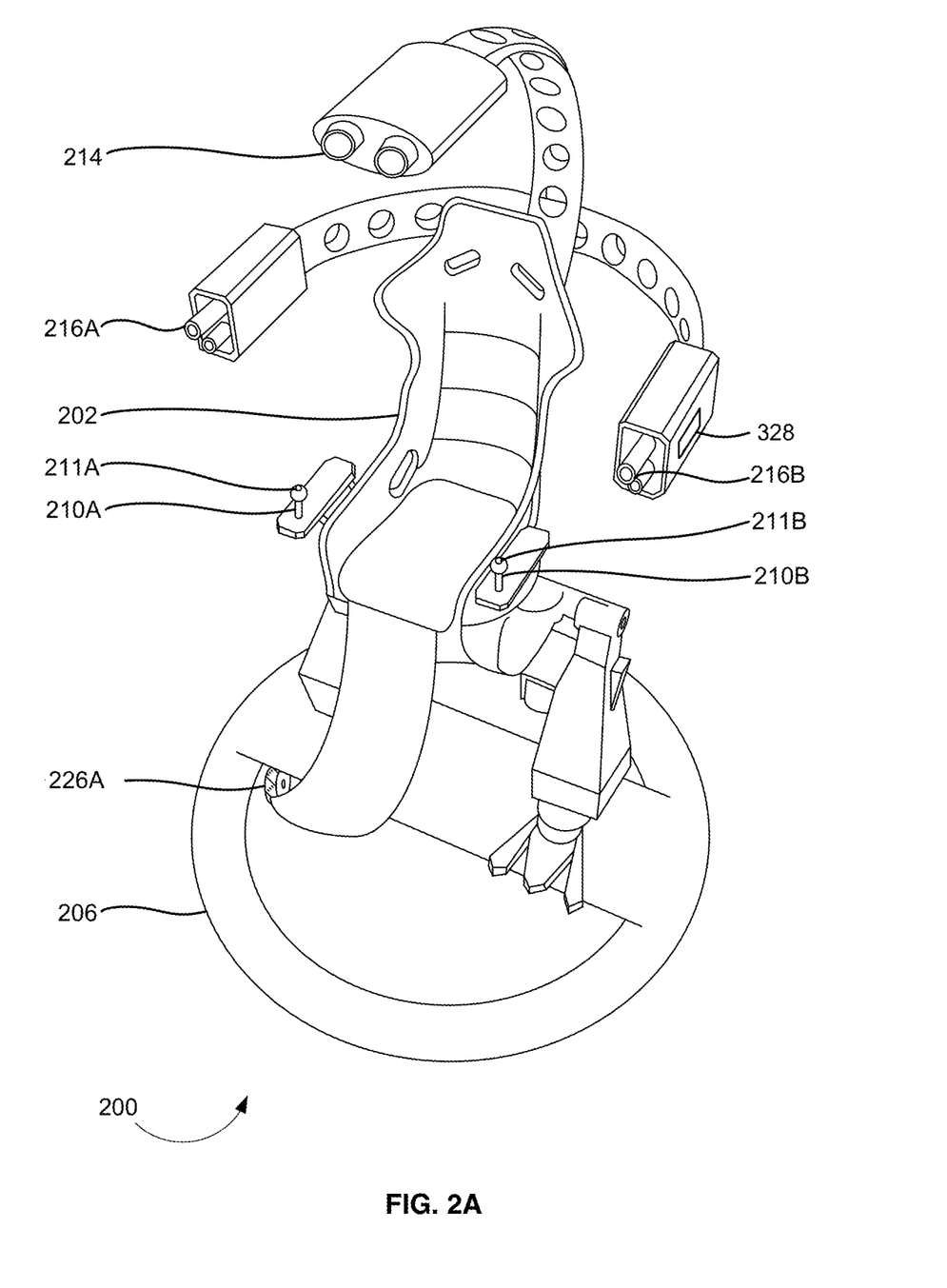
FIG. 2A illustrates a perspective view of a second rotatable chair according to an alternate embodiment herein.
Figure 3:
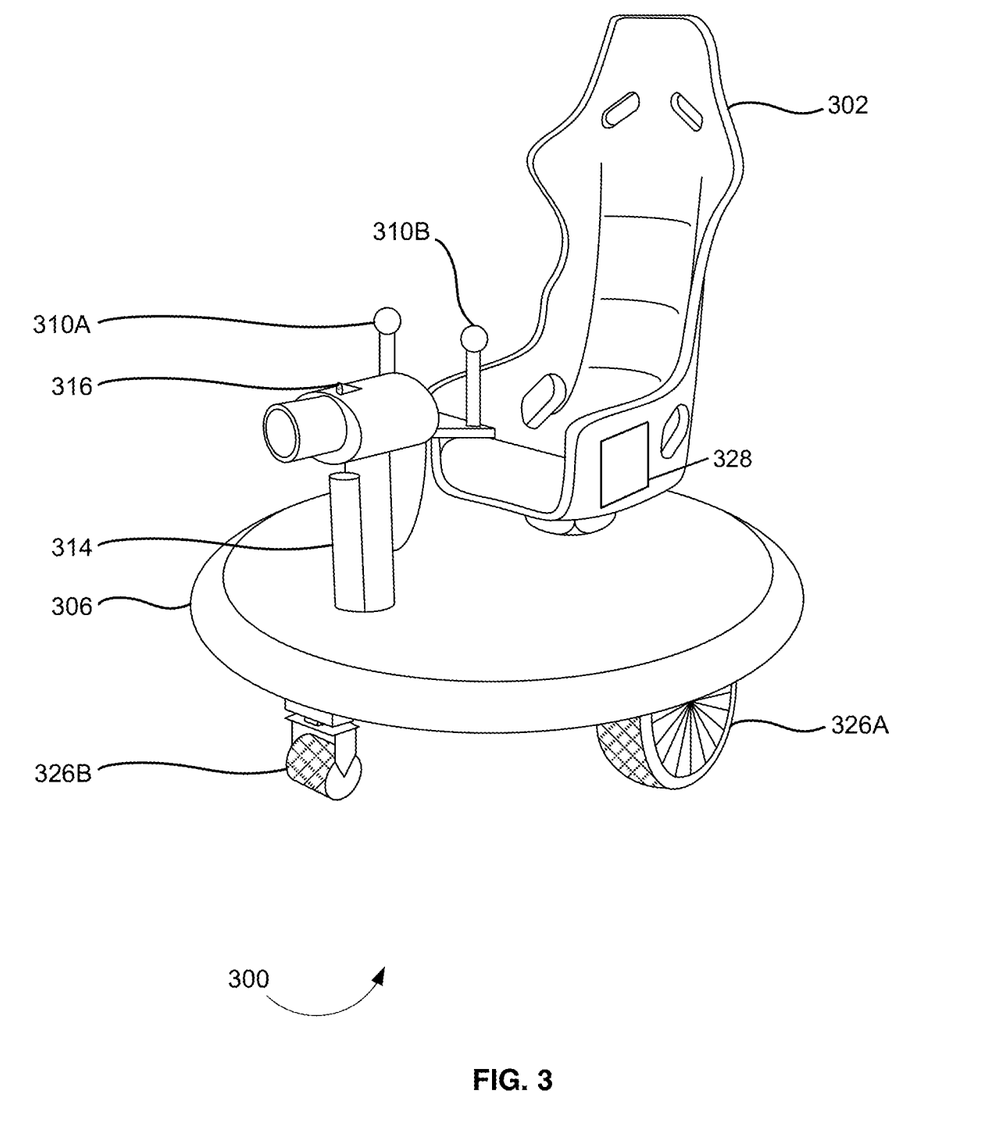
FIG. 3 illustrates a perspective view of a third rotatable chair according to another alternate embodiment herein.

FIG. 1D is a perspective view of one embodiment of a launching member 114 that can be used in embodiments of rotatable chairs 100, 200, 300 shown in FIGS. 1A, 2A and 3A. The launching member 114 includes a first tubular member 130A, a second tubular member 130B, a plurality of projectiles 132 such as balls, a platform 134, a weighted member 136, a flexible elongated member 138 such as a rope or cable or the like, a pulley 140, a hammer 142, a hammer head 144, and a hole 146. The first tubular member 130A substantially enclosing or substantially surrounding the platform 134 and the plurality of balls 132. The platform 134 is configured to provide a support for the plurality of projectiles 132. The second tubular member 130B substantially enclosing or substantially surrounding the weighted member 136. The flexible elongated member 138 is connected to the weighted member 136 on one end, and the platform 134 at the other end. The flexible elongated member 138 travels over the pulley 140 from the second tubular member 130B to the first tubular member 130A. The pulley 140 is positioned along the flexible elongated member 138 above and operationally between the platform 134. The plurality of projectiles 132 rest on the platform 134 in a stacked manner, one above the other in such a manner that the topmost ball is just in front of the hole 146 as the weighted member 136 balances the balls. The hole 146 is shaped to allow the plurality of projectiles to exit from the first tubular member when struck by the hammer 142.

When the user operates the first trigger member 111A on the joystick 110, the hammer head 144 of the hammer 142 strikes the topmost projectile/ball with a great impact and shoots the ball 132 out of the launching member 114. The hammer 142 and hammer head 144 can be of any form, and as shown in the embodiment is an elongated rod with a projection forming the hammer head 144 that is capable of contacting the topmost ball 132 in the first tubular member 130A. However, it can be envisioned that the hammer can be a variety of shapes and dimensions so long as it can strike a ball 132 such that the ball 132 ejects or is projected from the launching member 114. As the topmost ball 132 is ejected through the hole 146, the weight of the weighted member 136 is drawn downward due to gravity and fewer balls 132 forming a lighter counterweight to the weighted member 136, thereby raising the platform 134 until the next of the projectiles 132 is aligned with the hole 146.

The hammer is operationally controlled by a user operating a at least one of a number of triggers 111A, 111B, 211A, 211B, to actuate the hammer, thereby causing the hammer 142 to move and contact at least one of the plurality of projectiles 132 to launch the plurality of projectiles from the first tubular member 130A. After the hammer 142 contacts the projectile 132, the hammer 142 is drawn back to a resting position such that it can be retriggered to rotate and make contact with additional projectiles. In other embodiments, the hammer may not be drawn back, but the trigger signals the hammer 142 to both be drawn back and release forward during a triggering event to then to contact the projectiles 132 within the first tubular member 130A. The hammer 142 may be attached any part of any of the rotatable chairs 100, 200, 300, disclosed such as the base 106 or other part of the launching member, and connected in a way that allows rotational movement at one end at the hammer 142. One can envision that hammers 142 that use non-rotational movement to strike a ball 132 can easily be incorporated into the present invention. Once the projectiles 132 have been expended, the user can refill the projectiles 132 into the first tubular member 130A.

FIG. 2A illustrates a perspective view of a second rotatable chair 200 according to an alternate embodiment herein. The second rotatable chair 200 includes a chair seat 202, a circular base 206, a first joystick 210A, a second joystick 210B, a first trigger member 211A of the second rotatable chair 200, a second trigger member 211B of the second rotatable chair 200, a launcher 214, a first nozzle 216A, and a second nozzle 216B. The user sits on the chair seat 202 to operate the second rotatable chair 200. The first joystick 210A controls the movement of the second rotatable chair 200, and the second joystick 210B controls the tilt adjustments of the chair seat 202. The first joystick 210A includes a first trigger 211A to actuate the launcher 214. In one embodiment, the launcher 214 includes a plurality of balls. Upon actuation, the launcher 214 shoots the ball 132. The second joystick 210B includes a second trigger 211B to spray water from the first nozzle 216A and the second nozzle 216B.

When the user pushes the first joystick 210A in forward direction, the second rotatable chair 200 moves in forward direction. When the user pulls the first joystick 210A in backward direction, the second rotatable chair 200 moves in backward direction. The second rotatable chair 200 moves left and right when the user moves the first joystick 210A in left and right direction respectively.

Figure 2B:
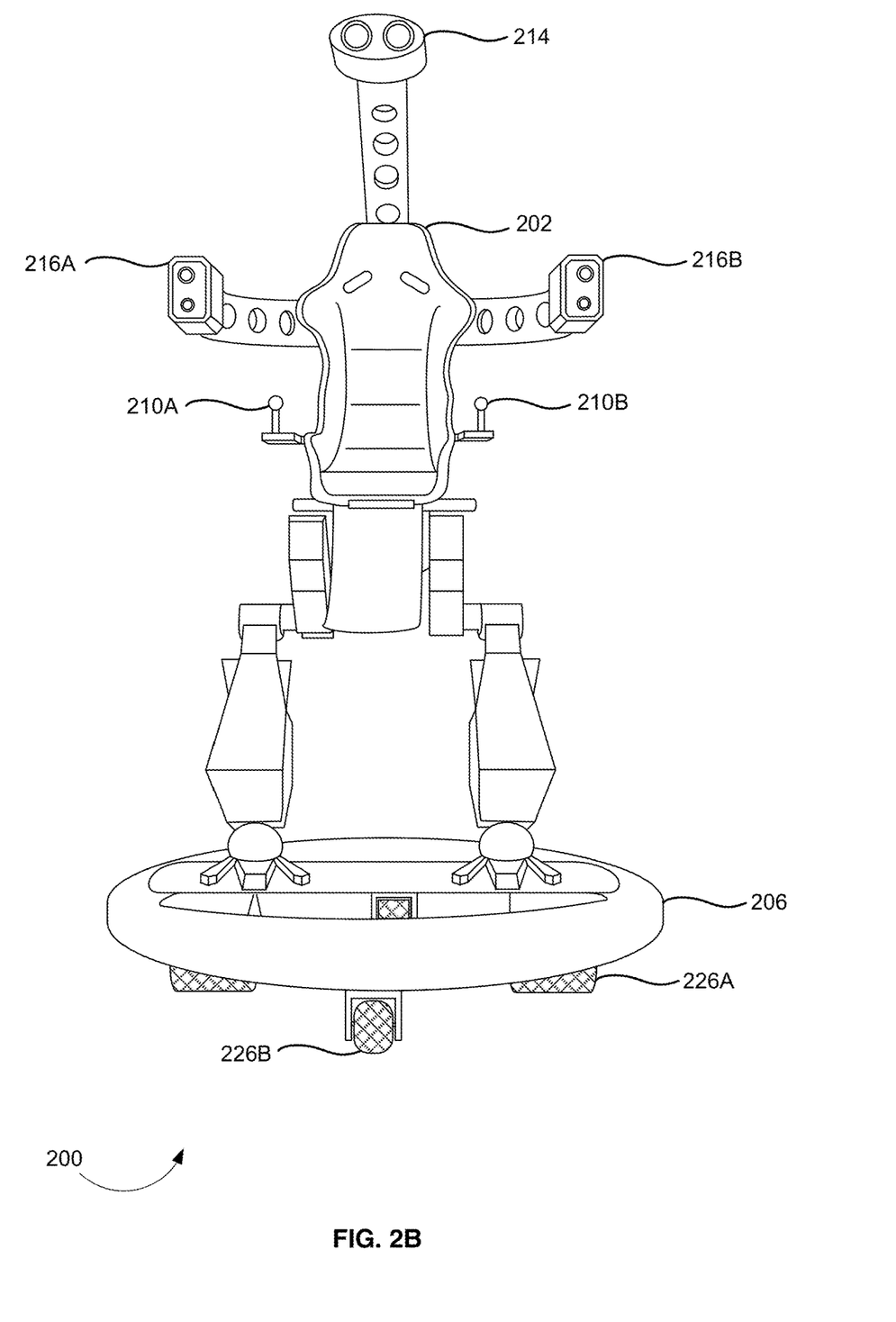
FIG. 2B is a front view of the second rotatable chair of FIG. 2A according to an embodiment herein.

FIG. 2B is a front view of the second rotatable chair 200 of FIG. 2A according to an embodiment herein. The second rotatable chair 200 of FIG. 2A further includes a set of wheels 226A and a directional wheel 226B. The set of wheels 226A run the second rotatable chair 200 with the help of a motor, and the directional wheel 226B (which may or may not motorized) provides the direction to move the second rotatable chair 200.

FIG. 3 illustrates a perspective view of a third rotatable chair 300 according to another alternate embodiment herein. The third rotatable chair 300 includes a seat 302, a base 306, a first joystick 310A, a second joystick 310B, a launcher 314, a nozzle 316, a set of wheels 326A, and a directional wheel 326B. The first joystick 310A controls the movement of the third rotatable chair 300, and the second joystick 310B controls the tilt adjustments of the seat 302. The first joystick 310A includes a first trigger member (shown in FIG. 2A as 211A) to actuate the launcher 314. In one embodiment, the launcher 314 includes a plurality of balls. Upon actuation, the launcher 314 shoots the ball. The second joystick 310B includes a second trigger member (shown in FIG. 2A as 211B) to spray water from the nozzle 316.

When the user pushes the first joystick 310A in forward direction, the third rotatable chair 300 moves in forward direction. When the user pulls the first joystick 310A in backward direction, the third rotatable chair 300 moves in backward direction. The third rotatable chair 300 moves left and right when the user moves the first joystick 310A in left and right direction respectively.

The third rotatable chair 300 of FIG. 3 further includes a set of wheels 326A and a directional wheel 326B. The set of wheels 326A run the third rotatable chair 300 with the help of a motor, and the directional wheel 326B provides the direction to move the third rotatable chair 300.

With respect to the wheels, a variety of types of wheels may be used such that the wheels can move in a multidirectional manner. For example, the wheels can be a Mecanum, Omni, or Ilon wheels. These types of wheels allow the vehicle to move in any direction and would be especially useful to move the rotatable chair 100, 200, 300 in tight spaces. The wheels enable conventional forward and backward movement as well as side to side movement and rotational turns, such as a tank. Using these types of wheels allows the chair 100, 200, 300 to translate around a room without changing the chair's 100, 200, 300 orientation relative to the room.

In one embodiment, the rotatable chair 100, 200, 300, may couple a paint gun or an airsoft gun or any other toy gun, additionally. The rotatable chair 100 is easy to assemble and disassemble due to the presence of detachment devices 118A, 118B, 118C, 118D (shown in FIGS. 1A-C) that allow easy coupling and decoupling of elements of the rotatable chair 100. The user may run and/or rotate the chair and use the launcher and/or spray gun at the same time to increase the entertainment.

Although there may be a variety of uses for the apparatus, a proposed purpose is that of an entertaining game. For more advanced players, the purpose of the game is to take out your opponent's weapon system (such as the nozzle 116 or launching member 114). One way to take out an opponent's weapon system is the use of a pressure sensor 328, as shown in FIG. 2A. The pressure sensor 328 may be located anywhere on the chair 100, 200, 300, and is shown as on the side of side of the projectile launcher or launching member 114 in FIG. 1A, the side near the nozzle 216B in FIG. 2A. or the side near the nozzle 216B in FIG. 2A. or the side of the seat 302 in FIG. 3. One can envision placement of pressure sensors 328 in other locations and more than one pressure sensor 328 per chair 100, 200, 300. These pressure sensors 328 act as targets on the chairs 100, 200, 300, and if the pressure sensors 328 are activated by a player hitting at least one of the pressure sensors 328 during game play, the movement of the chair becomes disabled and/or operation of the launcher 214 becomes disable. The pressure sensor 328 is therefore operative to disable at least one of movement of the rotatable chair 100, 200, 300 and operative to disable the launching member 114. To function, the pressure sensors 328 are operatively connected to the computing device to receive input from the pressure sensors sensors 328 to deactivate the chair 100, 200, 300. It would be the object the game to avoid your own chair 100, 200, 300 from being struck, and to strike other player's pressure sensors 328 with your projectiles to disable their chairs 100, 200, 300.

In the description, above, embodiments of a rotatable chair 100, 200, 300 for amusement may have any of the features alone, or in combination with any of the embodiments described and not only the features depicted in any one particular embodiment.

In addition, the launching member 114 may be included in any of the embodiments described above, but may also be independent of any of the embodiments of the rotatable chair for amusement and may be used as a standalone ball or projectile launcher.

The following reference numerals are used throughout FIGS. 1-3.

100 Rotatable chair (first embodiment)
102 Seat
104 Framing members
106 Base
108A First pole
108B Second pole
110 Joystick
111A First trigger member
111B Second trigger member
112 Emergency stop button
114 Launching member or launcher or projectile launcher
116 Nozzle (first embodiment)
118A First detachment device
118B Second detachment device
118C Third detachment device
118D Fourth detachment device
120 Water tank
122 Battery
124 Motor
126A Set of motorized wheels
126B Directional wheel
128 Computing device
130A First tubular member
132B Second tubular member
132 Plurality of projectiles/balls
134 Platform
136 Weighted member
138 Flexible elongated member/rope/cable
140 Pulley
142 Hammer
146 Hole
200 Second rotatable chair (second embodiment)

202 Seat of second rotatable chair (second embodiment)
210A First joystick (second embodiment)
210B Second joystick (second embodiment)
211A First trigger member (second embodiment)
211B Second trigger member (second embodiment)
214 Launcher or launching member or projectile launcher (second embodiment)
216A First nozzle (second embodiment)
216B Second nozzle (second embodiment)
226A Set of wheels (second embodiment)
226B Direction wheel (second embodiment)
300 Rotatable chair (third embodiment)
302 Seat (third embodiment)
306 Base (third embodiment)
310A First joystick (third embodiment)
310B Second joystick (third embodiment)
314 Launcher or launching member or projectile launcher (third embodiment)
316 Nozzle (third embodiment)
326A Set of wheels (third embodiment)
326B Direction wheel (third embodiment)
328 Pressure sensor While the invention has been described in terms of exemplary embodiments, it is to be understood that the words that have been used are words of description and not of limitation. As is understood by persons of ordinary skill in the art, a variety of modifications can be made without departing from the scope of the invention defined by the following claims, which should be given their fullest, fair scope.

What is claimed is:

1. A rotatable chair wherein said rotatable chair comprises:
   a seat;
   a motor;
   a battery connected to the motor;
   a set of wheels connected to the motor;
   a water tank;
   a base, wherein said base encloses said motor, said battery, said set of wheels and said water tank, and wherein the seat is positioned on top of the base;
   a plurality of framing members connected to the base;
   a joystick, wherein said joystick is configured to control movement of said rotatable chair;
   a launching member configured to shoot a plurality of projectiles, wherein said plurality of projectiles is characterized as being a plurality of balls;
   a nozzle configured to spray water from said water tank; and
   a trigger member configured to actuate at least one of said launching member and said nozzle.

2. The rotatable chair of claim 1, wherein said rotatable chair further comprises:
   an emergency stop button configured to stop said rotatable chair; and
   a plurality of detachment devices configured to fasten said plurality of framing members to said base, whereby said plurality of detachment devices allow a user to easily and quickly dismantle the rotatable chair into easily transportable parts.

3. The rotatable chair of claim 1, further comprising a pressure sensor, the pressure sensor operative to disable at least one of movement of the rotatable chair and operation of the launching member.

4. The rotatable chair of claim 1, wherein said set of wheels further comprises:
   a plurality of motorized wheels configured to move said rotatable chair; and
   a directional wheel configured to provide direction to said rotatable chair.

5. The rotatable chair of claim 4, wherein said battery is configured to provide power to said motor to run said plurality of motorized wheels.

6. The rotatable chair of claim 1, wherein said joystick is a plurality of joysticks, said plurality of joysticks include:
   a first joystick configured to operate said launching member to shoot said plurality of projectiles; and
   a second joystick configured to operate said nozzle to spray water from said water tank.

7. The rotatable chair of claim 6,
   wherein said trigger member is a plurality of trigger members, said plurality of trigger members includes a first trigger member positioned on said first joystick; and a second trigger member positioned on said second joystick.

8. The rotatable chair of claim 1, wherein said rotatable chair is configured to move in a forward direction when a user moves said joystick in the forward direction.

9. The rotatable chair of claim 8, wherein said rotatable chair is configured to move in a backward direction when said user moves said joystick in the backward direction.

10. The rotatable chair of claim 9, wherein said rotatable chair is configured to move in a left or right direction when said user moves said joystick in the left or right direction, respectively.

11. The rotatable chair of claim 1, wherein the launching member comprises:
    a first tubular member capable of substantially enclosing the plurality of projectiles, wherein the first tubular member substantially encloses a platform, the platform configured to provide support for said plurality of projectiles;
    a second tubular member substantially enclosing a weighted member, said weighted member configured to balance said plurality of projectiles resting on said platform;
    a flexible elongated member connected to said weighted member and said platform;
    a pulley positioned along said flexible elongated member above and operationally between said platform and said weighted member; and,
    a hammer, wherein said hammer comprises a hammer head configured to strike said plurality of projectiles.

12. The rotatable chair of claim 11, wherein the first tubular member comprises a hole sized and shaped to allow said plurality of projectiles to exit from said first tubular member when struck by said hammer.

13. A chair with a launching member and wheels, comprising:
    a seat;
    a base, wherein said base encloses a motor, a battery, a motorized set of wheels and a water tank;
    a plurality of framing members connected to the base;
    a joystick, wherein said joystick is configured to control movement of said chair;
    a launching member configured to shoot a plurality of projectiles, wherein the plurality of projectiles is characterized as being a plurality of balls;
    a nozzle connected to said water tank and configured to spray water from said water tank out from the nozzle;
    the set of motorized wheels configured to move the chair;
    a directional wheel configured to rotate the chair;
    an emergency stop button configured to stop the chair; and a plurality of detachment devices configured to fasten said plurality of framing members to said base.

\* \* \* \* \*